D. H. GIBBS.
MISFRAME INDICATOR FOR MOVING PICTURE FILMS.
APPLICATION FILED JULY 29, 1919.
1,334,028.
Patented Mar. 16, 1920.
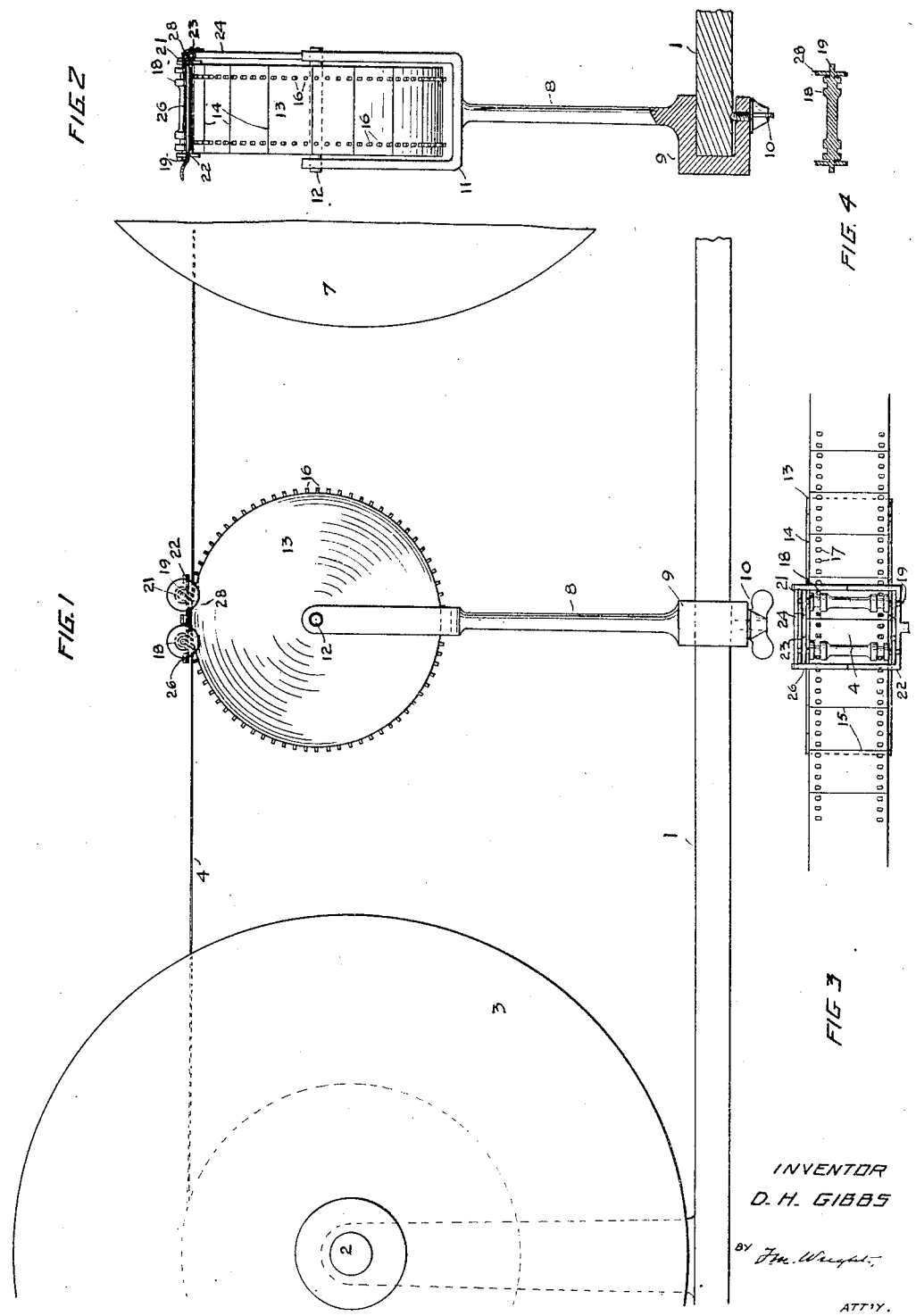
INVENTOR
D. H. GIBBS
BY F. M. Wright
ATT'Y.

UNITED STATES PATENT OFFICE.

DWIGHT H. GIBBS, OF SAN FRANCISCO, CALIFORNIA.

MISFRAME-INDICATOR FOR MOVING-PICTURE FILMS.

1,334,028.  Specification of Letters Patent.  Patented Mar. 16, 1920.

Application filed July 29, 1919. Serial No. 314,030.

*To all whom it may concern:*

Be it known that I, DWIGHT H. GIBBS, a citizen of the United States, residing at San Francisco, in the county of San Francisco and State of California, have invented new and useful Improvements in Misframe-Indicators for Moving-Picture Films, of which the following is a specification.

The object of the present invention is to provide a device for rapidly ascertaining the location of a "misframe" in a moving picture film. The term "misframe" is applied to an imperfect juncture of two portions of such a film, resulting in a series of pictures shown improperly on a screen, in that the bottom or top of the picture appears in a mediate position on the screen, so that portions of two pictures appear on the same screen. It is a common experience that films are occasionally so shown, to the annoyance of the spectators. Consequently, it is customary to inspect these films previous to projection upon a screen.

At present, this is done by an inspector observing the film when rewinding from the used reel on to an empty reel and noticing whether the line of demarcation between two successive "frames," as they are termed, that is, portions of the film from which single pictures are projected, registers properly with the sprocket holes in the film.

But this is a difficult task, and, moreover, should a lack of registry be detected, it is a long and tedious process to determine when registry of the frames ceases to be correct.

My device is intended to overcome this difficulty.

In the accompanying drawing, Figure 1 is a side view showing my device in use; Fig. 2 is a plan view of the device; Fig. 3 is a developed view of the circumference of a wheel of said device; Fig. 4 is a section of a roller.

Referring to the drawing, 1 indicates a table upon which are supported a shaft 2 for rotatably supporting a wheel 3 on to which a film 4 has been wound while projecting the pictures thereon and a shaft, not shown, supporting an empty wheel 7 upon which the film is to be rewound.

Between said wheels 3 and 7 is placed my improved indicating device. It consists of a support 8 having at its lower end a base 9 resting upon the table 1, and having a portion curved around the edge of the table, and attached thereto by a thumbscrew 10. Said support 8 is forked at its upper end, as shown at 11, and supports an axle 12 upon which is rotatably mounted a wheel 13, which I term an inspection wheel. Said wheel 13 is slightly wider than the film which is passed over it, and is of a circumference equal in length to 18 frames of the film. Its circumference is marked with 18 equidistant transverse lines 14 extending entirely across the circumference, and is provided, between each pair of adjacent lines, with two series of pins 16, four in each series, extending about one-sixteenth of an inch from the circumference and of a diameter the exact width of the sprocket holes 17 in the film, there being four sprocket holes in each side of each frame of the film. The lines 14 can be marked on the inspection wheel in any desired manner, preferably by being indented into said wheel. The wheel being wider than the film, the ends of the lines appear outside the edges of the film and should coincide with the black lines 15 of demarcation between the adjacent frames of the film. If the operator carefully inspects either side of the film while rewinding it, he will immediately detect any lack of registry between corresponding ends of said lines and the lines of demarcation, and it is an easy matter then to turn back the film to such point where the lack of registry first appears. In order to insure the film being held upon the wheel, I provide two spaced rollers 18, the reduced ends or shafts 19 of which are inserted in holes in end portions 21 of a metal frame 22, one side of which is hinged, as shown at 23, to a sheet metal support 24, riveted to one side of the forked upper end of the support 8. Flat springs 26 secured to said support 24 press down on said metal frame 22, and thus press said rollers on to the film as it is passing over for inspection, and by holding the portions of the film between said rollers, facilitates the detection of any lack of registry between the lines 14 and 15.

The rollers are provided at each end with somewhat large wheels 28 preferably integral therewith, which engage the ends of the inspection wheel 13, and maintain the film, and other moving parts, in proper relation to one another.

I claim:—

1. In means for detecting film misframes, a wheel wider than the film and over which said film travels, the circumference of said wheel being the length of an exact multiple of the length of a frame on the film, and means on the circumference of said wheel, spaced apart the length of a frame, for registering with uniformly spaced marks which appear on and extend transversely across the film.

2. In means for detecting film misframes, a wheel wider than the film and over which said film travels, the circumference of said wheel being the length of an exact multiple of the length of a frame on the film, and marks extending transversely on the circumference of said wheel, and being spaced apart the length of a frame, so as to register with the uniformly spaced transverse marks on the film.

3. Means for detecting film misframes, comprising a wheel wider than the film and over and upon which the film travels, means on said wheel for engaging the film and guiding it over the wheel with its edges spaced inwardly from the side edges of the wheel, and marks extending transversely on the circumference of the wheel, spaced apart the length of a frame of the film and adapted to aline with the uniformly spaced marks extending transversely across the film between the frames, said wheel marks being visible upon opposite sides of the film.

D. H. GIBBS.